(12) United States Patent
Rates Palau et al.

(10) Patent No.: US 10,910,842 B2
(45) Date of Patent: Feb. 2, 2021

(54) SYSTEMS AND METHODS FOR PROVIDING ELECTRICAL POWER TO WIND TURBINE COMPONENTS

(71) Applicants: GE Renewable Technologies Wind B.V., Breda (NL); General Electric Renovcables Espana, S.L., Barcelona (ES)

(72) Inventors: Sergi Rates Palau, Barcelona (ES); Kevin Schoenleber, Barcelona (ES); Andre Langel, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 252 days.

(21) Appl. No.: 16/003,806

(22) Filed: Jun. 8, 2018

(65) Prior Publication Data
US 2018/0358814 A1 Dec. 13, 2018

(30) Foreign Application Priority Data

Jun. 9, 2017 (EP) .................................. 17382357

(51) Int. Cl.
*H02J 3/38* (2006.01)
*H02J 9/04* (2006.01)
*H02J 3/18* (2006.01)

(52) U.S. Cl.
CPC ............ *H02J 3/386* (2013.01); *H02J 3/1878* (2013.01); *H02J 3/38* (2013.01); *H02J 9/04* (2013.01); *H02J 3/388* (2020.01)

(58) Field of Classification Search
CPC ..................................................... H02J 3/386
(Continued)

(56) References Cited

U.S. PATENT DOCUMENTS 9,124,143 B2 * 9/2015 Sala Lluma ............. H02J 11/00
2009/0251009 A1 * 10/2009 Kleinecke ............... H02M 7/10
307/115
(Continued)

FOREIGN PATENT DOCUMENTS

EP 2 236 821 A1 10/2010
EP 2 647 839 A2 10/2013
(Continued)

OTHER PUBLICATIONS

Extended European Search Report and Opinion issued in connection with corresponding EP Application No. 17382357.6 dated Nov. 24, 2017.

*Primary Examiner* — Rexford N Barnie
*Assistant Examiner* — Dru Parries
(74) *Attorney, Agent, or Firm* — Dority & Manning, P.A.

(57) ABSTRACT

System for providing electrical power to wind turbine components comprising a busbar, an electrical grid, and an auxiliary power source for selectively providing electrical power to the busbar with an auxiliary power voltage, wherein the main voltage is different from the auxiliary power voltage. The system includes one or more wind turbines comprising a wind turbine generator, a main transformer for connecting the wind turbine generator to the busbar, one or more wind turbine components, and an auxiliary wind turbine transformer. The wind turbine components are arranged to be selectively connected to the main transformer and the busbar through a first path or a second path. The system is configured to select the first path if the voltage at the busbar is the main voltage and to select the second path if the voltage at the busbar is the auxiliary power voltage.

15 Claims, 5 Drawing Sheets

(58) Field of Classification Search
USPC .......................................................... 307/19
See application file for complete search history.

(56) References Cited

U.S. PATENT DOCUMENTS

2011/0285830 A1* 11/2011 Kim .................. H04N 5/63
348/56
2013/0301167 A1 11/2013 Langel

FOREIGN PATENT DOCUMENTS

EP      2 713 477 A1    4/2014
EP      2 784 305 A1    10/2014

* cited by examiner

SYSTEMS AND METHODS FOR PROVIDING ELECTRICAL POWER TO WIND TURBINE COMPONENTS

The present disclosure relates to systems for providing electrical power to wind turbine components. The present disclosure further relates to methods for providing electrical power to wind turbine components, in particular when the electrical grid does not provide electrical power to such systems.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

Wind turbines may be arranged together forming a wind park, with a single point of connection to the electrical grid, i.e. the PCC ("Point of Common Coupling"). Wind parks may comprise a substation including e.g. wind park transformers that convert power from the wind park voltage to a grid voltage. Such a substation may further include wind park control systems e.g. a supervisory control and data acquisition system (SCADA).

Wind parks may be arranged on land ("onshore"), or in the water ("offshore"), either as a plurality of floating wind turbines or with wind turbines on pillars fixed in the sea bed.

In wind turbines, there are electrical components which are required to operate continuously, even during stand-by situations. These components may include components related to air conditioning systems, sensors, PLCs, beacons and protective systems among others.

There are also components which are less critical. These components may be required to operate only occasionally during stand-by situations. These components may include lubrication pumps, lighting systems, the service lift, pitch and yaw systems among others.

Most modern wind turbines may also include an auxiliary transformer that provides a source of low-voltage (typically about 400 V) power to the wind turbine. This auxiliary transformer supplies the above-commented electrical components forming part of the wind turbine. The auxiliary transformer is generally housed within the wind turbine's nacelle and is connected on the low-voltage side of the wind turbine's main transformer. An auxiliary transformer may also be associated with a substation, in which case the auxiliary transformer may supply a plurality of wind turbines.

In summary, power supply must always be available for at least some of the electrical components forming part of a wind turbine. And for some other electrical components, power supply may need to be ensured intermittently.

However, connection with the grid may be lost during planned maintenance, or during installation, but also during normal operation in case of a problem in the grid. Additionally, sometimes the wind turbine has to be stopped for an inspection and the connection of the transformer to the grid has to be cut. Wind turbines that are disconnected from the medium voltage collector system for repair or maintenance work cannot provide electrical power. In these cases one or more auxiliary power sources have to be provided for most of the electrical components.

For example, a plurality of auxiliary power generators e.g. diesel generators may be installed at individual wind turbines to be able to supply power to each wind turbine individually. Or alternatively, at least one more powerful auxiliary power generator may be provided at the central substation supplying all wind turbines simultaneously.

EP2713477 discloses a method for operating an inner park network of an electric circuit with an operating voltage in a normal operation. Electrical wind energy system generators, which are driven by wind energy systems, are coupled with the network in the normal operation. The network is operated with another operating voltage in an operating mode different from the normal operation, where the latter operating voltage is smaller than the former operating voltage. The generators are not coupled with the network and/or the network is separated from a power grid in the operating mode.

SUMMARY

In a first aspect, a system for providing electrical power to one or more wind turbine components is provided. The system comprises a busbar, an electrical grid for providing electrical power to the busbar with a main voltage, and an auxiliary power source for selectively providing electrical power to the busbar with an auxiliary power voltage, wherein the main voltage is different from the auxiliary power voltage. The system further comprises one or more wind turbines comprising a wind turbine generator, a main transformer for connecting the wind turbine generator to the busbar, one or more wind turbine components, and an auxiliary wind turbine transformer for connecting the main transformer to the wind turbine components. The system further comprises that the wind turbine components are arranged to be selectively connected to the main transformer and the busbar through a first path or a second path, the system further being configured to select the first path if the voltage at the busbar is the main voltage and to select the second path if the voltage at the busbar is the auxiliary power voltage.

According to this first aspect, a system that is configured to the function of selectively connect the main transformer and the busbar to the wind turbine components through a first path if the voltage at the busbar is the main voltage or through a second path if the voltage at the busbar is the auxiliary power voltage is provided.

The electrical power consumed by the wind turbine components during normal operation is either supplied by the electrical grid (if e.g. there is no wind) or supplied by the wind turbine itself (if e.g. there is wind and the wind turbine is generating electrical power).

In normal operation, particularly when the electrical grid provides electrical power, the main transformer is used for lowering a relatively high voltage supplied by the electrical grid. However, when the electrical grid does not provide electrical power (e.g. due to maintenance or in case of a grid loss) and the auxiliary power source is connected, the busbar receives electrical power at a lower voltage than the voltage in normal operation. The path connecting the wind turbine components and the busbar may be modified with respect to the path set in normal operation such that the same constant voltage is supplied to the electrical components in response to a voltage supplied by either the electrical grid or the auxiliary power source.

Such operation is performed without the need of bypassing the main transformer. The wind turbine generator and corresponding converter thus remain connected. Therefore, they may be used e.g. to supply reactive power. Some other operations of the wind turbine including e.g. motorization of the generator to rotate the hub are also still available.

In a second aspect, a method for providing electrical power to one or more wind turbine components in a system as such as previously described is provided. The method comprises detecting a drop in the electrical power supplied from the electrical grid, selecting the second path for connecting the busbar and the main transformer to the wind turbine components, and operating the auxiliary power source to provide power to the busbar.

According to this aspect, a method for providing electrical power to one or more wind turbine components is provided in which electrical power supply to the electrical components of the wind turbine can be maintained, even when no power is delivered from the electrical grid.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Throughout the present description and claims the term "ratio" may be defined as the number of turns of the primary winding divided by the number of turns of the secondary winding. This ratio value dictates the operation of the transformer and the corresponding voltage available on the secondary winding for a given voltage at the primary winding. The ratio, which has no units, compares the two windings and is written with a colon, such as 3:1 (3-to-1). This means in this example, that if there are 3 volts on the primary winding there will be 1 volt on the secondary winding, 3 volts-to-1 volt. Thus, if the ratio between the number of turns changes the resulting voltages must also change by the same ratio.

Figure 1:
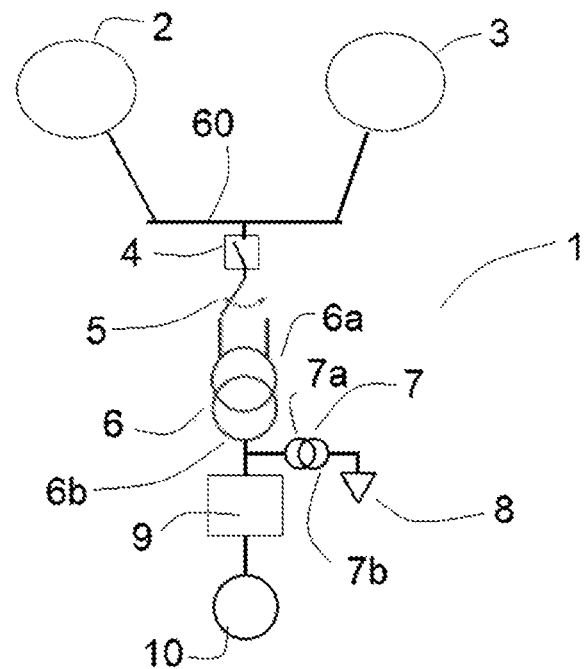
FIG. 1 schematically illustrates an example of a system providing electrical power to one or more wind turbine components.

FIG. 1 schematically illustrates an example of a system providing electrical power to one or more wind turbine components. FIG. 1 shows a system 1 comprising an electrical grid 2 e.g. a transformer of a substation connecting an offshore wind park to a high voltage transmission line (either High Voltage DC or High Voltage AC).

The system 1 in this example further comprises an auxiliary power source 3 e.g. a diesel generator. The auxiliary power source 3 may also be provided at the above-commented substation. Any kind of auxiliary power source 3 may be used, but diesel generators are the most common. In some examples, a single auxiliary power source may be sufficient to supply power to all wind turbines during standby situations. The single auxiliary power source may be arranged at an offshore substation in case of an offshore wind park. In another example, a plurality of auxiliary power sources may be arranged at the electrical grid or at the offshore substation.

The electrical grid 2 and the auxiliary power source 3 may be connected to a busbar 60. Additionally, the electrical grid 2 is configured to provide electrical power to the busbar 60 with a main voltage e.g. in normal operation. In different circumstances e.g. in case of a grid loss, the auxiliary power source 3 is configured to provide electrical power to the busbar 60 with an auxiliary power voltage, wherein the auxiliary power voltage is different from the main voltage supplied by the electrical grid 2 e.g. in normal operation.

Additionally, the system 1 comprises a wind turbine 10. The wind turbine 10 comprises a converter 9. The wind turbine 10 further comprises a main transformer 6 including a primary winding 6a and a secondary winding 6b.

The primary winding 6a of the main transformer 6 is connected to the busbar 60 and thus is arranged to receive electrical power from the electrical grid 2 or the auxiliary power source 3. The secondary winding 6b of the main transformer is configured to deliver electrical power to the converter 9.

An auxiliary transformer 7 is arranged that delivers electrical power to some predetermined wind turbine components 8. These components may include e.g. one or more of air conditioning systems, sensors, PLCs, beacons or protective systems.

Following the example, the auxiliary wind turbine transformer 7 comprises a primary winding 7a and a secondary winding 7b. The primary winding 7a is configured to receive electrical power from the main transformer 6 and the secondary winding 7b is configured to deliver electrical power to the wind turbine components 8.

A circuit breaker 4 may be arranged upstream of the main transformer 6 for disconnecting the main transformer 6 from the busbar 60.

Moreover, a primary switch 5 may be provided. The switch 5 may be arranged to modify the ratio of turns of the main transformer by alternatively connecting the electrical grid 2 or the auxiliary power source 3 to either a first set of turns of the primary winding 6a of the main transformer 6 using a first tap 36 or a second set of turns of the primary winding 6a of the main transformer 6 using a second tap 35.

Figure 2:
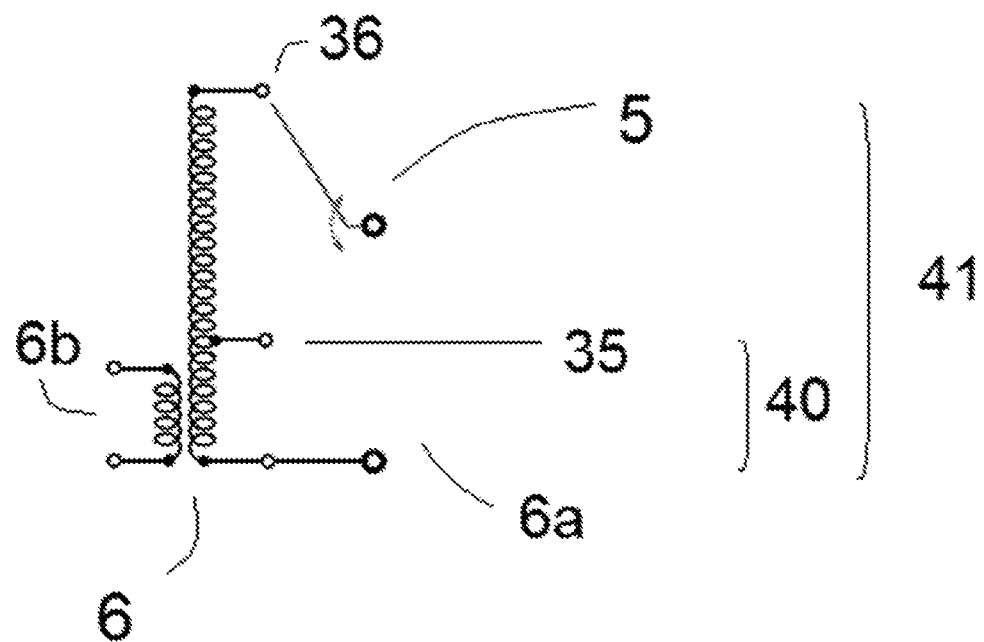
FIG. 2 schematically illustrates an example of a transformer and a switch which may be used in examples of the systems and method according to the present disclosure.

As shown in FIG. 2, the primary winding 6a of the main transformer 6 may comprise a first set of turns 41 and a second set of turns 40. In this example, the second set of turns 40 may be comprised within the first set of turns 41. Additionally, a first tap 35 and a second tap 36 may be provided at the primary winding 6a of the main transformer 6.

The first set of turns may include the second set of turns. The total set of turns of the secondary winding may correspond to the first set of turns, whereas the second set of turns corresponds to a selection of the set of turns.

A control signal that orders the switch 5 to modify the ratio (and thus a change in the set of turns connected) due to a change from grid supply to auxiliary power supply (or vice versa) may be generated at the level of a supervisory control and data acquisition system (SCADA) of a wind park and may be sent to the switch 5. In some examples, the change from grid supply to auxiliary power supply may also be detected locally, e.g. through a sustained absence of grid voltage. In this latter case, the modification of the ratio of turns is done automatically and autonomously by the switch 5.

In normal operation i.e. when grid supplies electrical power, the electrical grid may be connected to the first set of turns 41 of the primary winding 6a using the tap 36. In this example, the ratio may be 20:1. The main transformer 6 may thus convert power from 66 kV as delivered from the grid to 3.3 kV.

In different circumstances, i.e. in the case where the grid is disconnected from the wind turbine and the auxiliary power source is operated, the switch 5 may be operated to modify the ratio of the main transformer 6 by connecting a second set of turns 40 of the primary winding 6a of the main transformer 6 to the auxiliary power source. With such an arrangement, the ratio of the main transformer may be 1.82:1. The main transformer 6 may thus convert power from 6 kV as delivered from the auxiliary power source to 3.3 kV.

As illustrated here, regardless of whether the power is delivered by the electrical grid at a main voltage of 66 kV or from the auxiliary power source at an auxiliary power voltage of 6 kV, the output voltage of the main transformer is 3.3 kV.

The taps used may be mechanical tap changers, electrical tap changers or electrically assisted tap changers although some other taps are possible.

Again in FIG. 1, the auxiliary wind turbine transformer 7 will further transform the power from 3.3 kV to the voltage level required by the electrical components 8 of the wind turbine, such as e.g. lighting systems, pitch systems, pumps, cooling fans, etc. This voltage level may be 0.4 kV. In this example, the ratio of the auxiliary wind turbine transformer 7 may be a fixed ratio of e.g. 8.3:1. Since the output voltage of the main transformer in this example is constant regardless of whether the power is delivered by the electrical grid or the auxiliary power source, the voltage provided to the wind turbine components is constant as well.

As previously commented, there are electrical components 8 which are required to operate continuously, even during stand-by situations. These electrical components 8 always need power supply and the interruption of the operation cannot be accepted. To this effect, in some examples, an uninterruptible power supply (not shown) may be added to the (critical) electrical components. In case of grid loss, it will generally not be possible to have electrical power immediately delivered from the auxiliary power source 3. For example, a diesel generator needs to be started up and warmed up before being able to deliver full power. The uninterruptible power supply (not shown) may be able to deliver electrical power for e.g. up to approximately 30 minutes or more. By then, the electrical power supply from the auxiliary power source 3 should be established.

Figure 3:
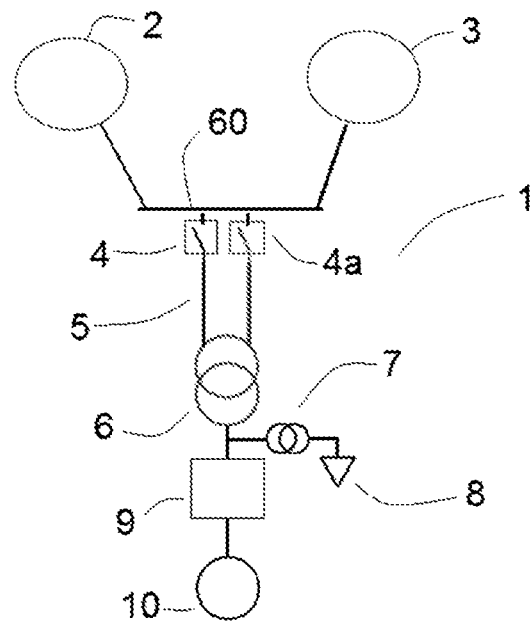
FIG. 3 schematically illustrates another example of a system providing electrical power to one or more wind turbine components.

FIG. 3 schematically illustrates another example of a system providing electrical power to one or more wind turbine components. The system 1 shown in FIG. 2 differs from the system shown in FIG. 1 only in that a second circuit breaker 4a is included. The structure and operation of the remaining components of the system may substantially be the same as hereinbefore described.

In this example, there are two circuit breakers 4, 4a which together function as a switch to modify the turns ratio of the main transformer and selectively connect the busbar 60 to the first set of turns of the main transformer or to the second set of turns of the main transformer 6.

The first circuit breaker 4 is arranged to selectively connect the busbar 60 to a first set of turns of the primary winding of the main transformer 6 using a first tap. The second circuit breaker 4a is further arranged to selectively connect the busbar 60 to a second set of turns of the primary winding of the main transformer 6 using a second tap.

In case of normal operation, the first circuit breaker 4 may connect the electrical grid 2 to a first set of turns of the primary winding of the main transformer 6 via a first tap. At the same time, the second circuit breaker 4a may be opened and it may thus disconnect the electrical grid from the second set of turns of the main transformer 6. Particularly, in this example, the ratio of the main transformer 6 may be the same as for the example of FIG. 1, namely 20:1. The main transformer may thus convert power from 66 kV as delivered from the grid to 3.3 kV.

In case of e.g. grid loss, the auxiliary power source may be activated and the first circuit breaker 4 may be operated (and thus opened). The first circuit breaker 4 may thus disconnect the busbar 60 from the main transformer 6. At the same time, the second circuit breaker 4a may be operated (and thus closed). The auxiliary power source may thus be connected to the second set of turns of the primary winding of the main transformer 6. Therefore, the ratio of the main transformer may be modified to 1.82:1. The main transformer may thus convert power from 6 kV as delivered from the auxiliary power source to 3.3 kV.

As commented above, the operation of the auxiliary wind turbine transformer may be the same as hereinbefore described. The voltage level supplied to the electrical components may thus be constant 0.4 kV.

Figure 4:
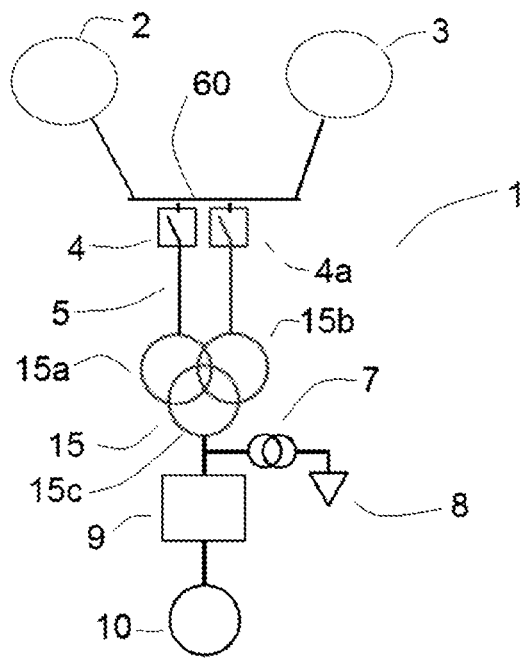
FIG. 4 schematically illustrates a further example of a system providing electrical power to one or more wind turbine components.

FIG. 4 schematically illustrates a further example of a system providing electrical power to one or more wind turbine components. The system 1 shown in FIG. 4 differs from the system shown in FIG. 3 only in that the main transformer is a three-winding transformer 15.

In this particular example, the primary winding of the three-winding main transformer 15 may comprise a first primary winding 15a and a second primary winding 15b. The secondary winding 15c of the main transformer 15 may be the same or similar to the one shown in previous figures.

The first primary winding 15a may comprise a first set of turns. The second primary winding 15b may comprise a second set of turns.

In this example, the first circuit breaker 4 is arranged to selectively connect the busbar to the first set of turns of the first primary winding 15a of the main transformer 15 using a first tap. The second circuit breaker 4a is further arranged to selectively connect the busbar to a second set of turns of the second primary winding 15b of the main transformer 15 using a second tap. The first and second circuit breakers 4, 4a together function as a switch to determine and, if necessary, modify the ratio of turns of the main transformer.

The remaining structure and operation of the system 1 either in normal operation or in case of grid loss may be the same or similar to the one described in FIG. 3.

Figure 5:
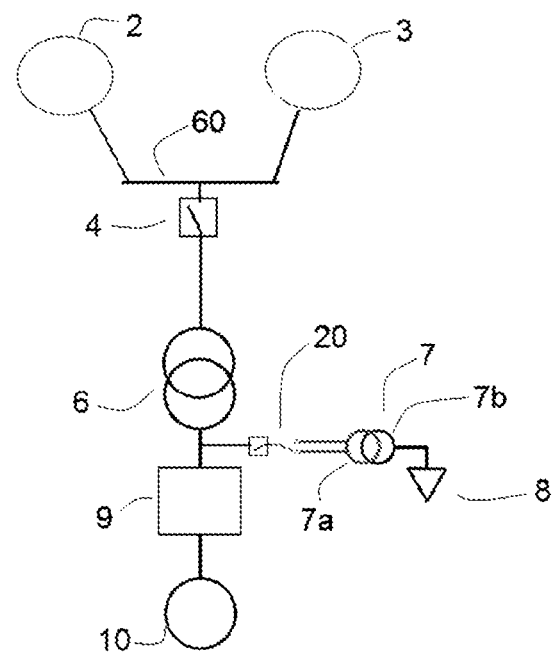
FIG. 5 schematically illustrates yet a further example of a system providing electrical power to one or more wind turbine components.

FIG. 5 schematically illustrates yet a further example of a system providing electrical power to one or more wind turbine components. The system 1 shown in FIG. 5 differs from the system shown in FIG. 1 only in that a switch 20 is provided between the secondary winding of the main transformer 6 and the primary winding 7a of the auxiliary transformer 7 and no switch is provided between the electrical grid or the auxiliary power source and the primary winding of the main transformer 6 of the wind turbine.

The switch 20 is arranged to modify the ratio of the auxiliary transformer 7 by alternatively connecting the main wind turbine transformer 6 to either a first set of turns of the primary winding 7a of the auxiliary wind turbine transformer 7 or a second set of turns of the primary winding 7a of the auxiliary wind turbine transformer 7.

In case of normal operation, the main transformer 6 may convert power from 66 kV as delivered from the grid to 3.3 kV. The ratio of the main transformer may be a fixed ratio of 20:1. The switch 20 may connect the secondary winding of the main transformer 6 to a first set of turns of the primary winding 7a of the auxiliary transformer 7 via a first tap. The ratio of the auxiliary winding may be e.g. 8.25:1. The auxiliary transformer may thus convert power from 3.3 kV as delivered from the main transformer to 0.4 kV.

In case of e.g. grid loss, the auxiliary power source 7 is operated. As commented above, the ratio of the main transformer may be 20:1. The main transformer may thus convert power from 6 kV as delivered from the auxiliary power source to 0.3 kV. Additionally, the switch 7 may be operated. A second set of turns of the primary winding 7a of the auxiliary transformer 7 may thus be selected. In consequence, the ratio of the auxiliary transformer may be modified to e.g. 0.75:1. The auxiliary transformer may thus convert power from 0.3 kV as delivered from the main transformer to 0.4 kV. Again in this example, regardless of whether the power is delivered by the electrical grid at a main voltage of 66 kV or from the auxiliary power source at an auxiliary power voltage of 6 kV, the output voltage of the auxiliary transformer is maintained at 0.4 kV, which is the voltage required by the electrical components 8 of the wind turbine.

Figure 6:
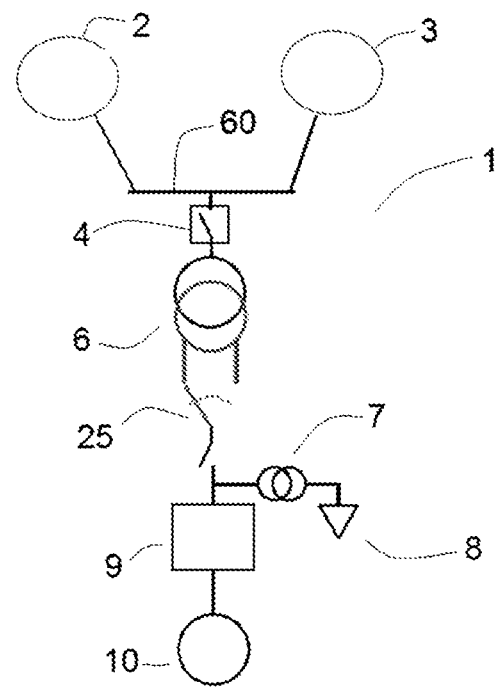
FIG. 6 schematically illustrates another example of a system providing electrical power to one or more wind turbine components.

FIG. 6 schematically illustrates another example of a system providing electrical power to one or more wind turbine components. The system 1 shown in FIG. 6 differs from the system shown in FIG. 1 only in that a switch 25 between the secondary winding of the main transformer 6 and the primary winding of the auxiliary transformer 7 is provided and no switch is provided between the electrical grid 2 or the auxiliary power source 3 and the primary winding of the main transformer 6.

The switch 25 is arranged to modify the ratio of the main transformer 6 by alternatively connecting either a first set of turns of the secondary winding of the main transformer 6 or a second set of turns of the secondary winding of the main transformer 6 to the auxiliary wind turbine transformer 7. The first set of turns may include the second set of turns. The total set of turns of the secondary winding may correspond to the first set of turns, whereas the second set of turns corresponds to a selection of the set of turns.

In case of normal operation, the switch 25 may connect the secondary winding of the auxiliary transformer 7 to a second set of turns of the secondary winding of the main transformer 6 via a first tap. The ratio of the main transformer may be 20:1. The main transformer may thus convert power from 66 kV as delivered from the grid to 3.3 kV.

In case of e.g. grid loss or during some form of maintenance, the auxiliary power source 3 may be operated. The switch 25 may also be operated to connect a first set of turns of the secondary winding of the main transformer to the auxiliary wind turbine transformer. With such an arrangement, the ratio of the main transformer may be 1.82:1. The main transformer may thus convert power from 6 kV as delivered from the auxiliary power source to 3.3 kV.

Both in normal operation or in case of grid loss, the auxiliary wind turbine transformer 7 may be provided with a fixed ratio between the primary winding to secondary winding. This way, the auxiliary wind turbine transformer will further transform the power from 3.3 kV to a voltage level of e.g. 0.4 kV required by the electrical components 8 of the wind turbine.

In all the above-commented examples, the path selected between either the electrical grid 2 or the auxiliary power source 3 and the electrical components includes the auxiliary wind turbine transformer.

Figure 7:
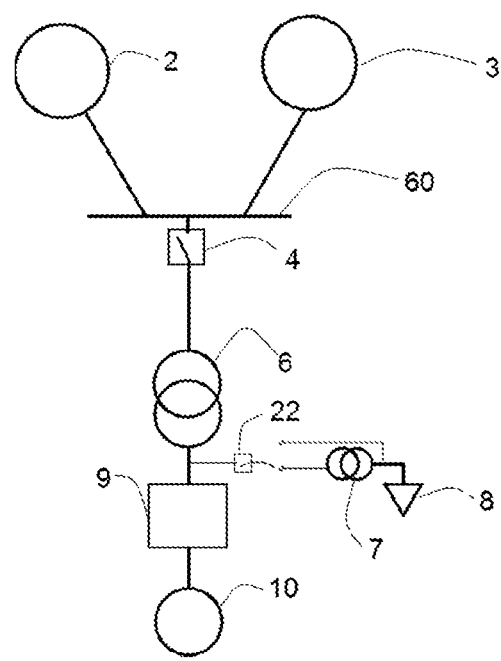
FIG. 7 schematically illustrates yet another example of a system providing electrical power to one or more wind turbine components.

FIG. 7 schematically illustrates yet another example of a system providing electrical power to one or more wind turbine components. As commented in previous examples, the electrical grid 2 and the auxiliary power source 3 may be connected to a busbar 60.

A switch 22 may be provided. The switch 22 may be arranged to selectively connect either a first path between the electrical grid 2 or the auxiliary power source 3 and the electrical components, wherein the first path includes the main transformer and the auxiliary transformer or a second path, wherein the second path includes the main transformer and it does not include the auxiliary transformer.

In normal operation i.e. when grid supplies electrical power, the switch 22 may connect the first path. The main transformer may be provided with a fixed ratio e.g. 20:1. The main transformer 6 may thus convert power from 66 kV as delivered from the grid to 3.3 kV.

The auxiliary wind turbine transformer 7 will further transform the power from 3.3 kV as delivered from the main transformer to the voltage level required by the electrical components 8 of the wind turbine, such as e.g. lighting systems, pitch systems, pumps, cooling fans, etc. This voltage level may be 0.4 kV. In this example, the ratio of the auxiliary wind turbine transformer 7 may be a fixed ratio e.g. 8.3:1.

In case of e.g. grid loss or during some form of maintenance, the auxiliary power source 3 may be operated. The switch 22 may also be operated to select the second path. The main transformer 6 (with fixed ratio 20:1) may thus convert power from e.g. 8 kV as delivered from the auxiliary power source to 400 V while bypassing the auxiliary wind turbine transformer 7. The electrical components 8 of the wind turbine may thus be powered at the desired voltage level, namely 400 V.

It is thus clear that in all the examples, a suitable and constant voltage of 0.4 kV may be supplied to the electrical components either in normal operation or in case of grid loss.

It should be clear that the voltages of 0.4 kV for the wind turbine components, 66 kV for the electrical grid and 6 kV or 8 kV for the auxiliary power source are merely examples and that different voltages (possibly resulting in turns ratios) are possible within the scope of the present disclosure.

Figure 8:
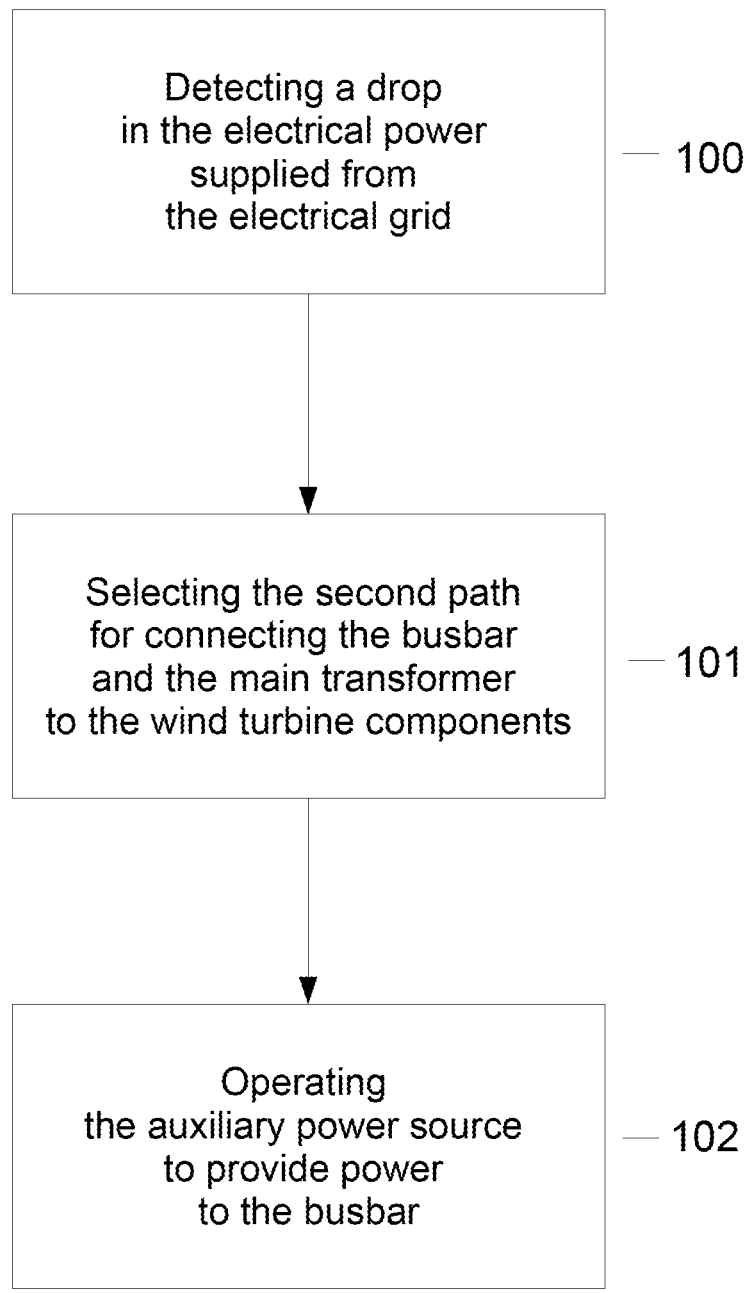
FIG. 8 schematically illustrates an example of a method for providing electrical power to wind turbine components.

FIG. 8 is an illustration of a block diagram describing an example of a method for providing electrical power to one or more wind turbine components.

A system for providing electrical power to one or more wind turbine components as hereinbefore described may be provided.

At block 100, a drop in the electrical power supplied from the electrical grid may be detected. This may involve that the connection with the grid may be lost e.g. during planned maintenance or during normal operation in case of a problem in the grid.

In some examples, detecting the drop in power supply comprises detecting a drop in power supply by a voltmeter.

The voltmeter may be used to detect electrical power supply from the grid, i.e. as long as a voltage is present, electrical power is supplied by the grid. In alternative arrangements, some other device suitable for detecting the presence of power supply in the electrical grid may be used.

In some examples, in order to detect the drop in the electrical power supplied from the electrical grid, the voltage drop may be sustained during e.g. 30 minutes or 1 hour. Additionally, the detection of the drop in the electrical power may be supported by an additional signal by the offshore substation that e.g. a grid loss is occurring.

Detection of a drop in power supply may be done at a central level, e.g. at a SCADA of a wind park. Alternatively, detection of a drop in power supply may be done at the local level of a wind turbine.

At block 101, a second path for connecting the busbar and the main transformer to the wind turbine components may be selected.

At block 102, the auxiliary power source may be operated to provide power to the busbar. The operation of the auxiliary power source may be performed as described in previous examples.

Consequently, the voltage at the wind turbine components is maintained constant regardless of the voltage at the busbar.

In an aspect of the present disclosure, a system for providing electrical power to one or more wind turbine components is provided. The system comprises a busbar, an electrical grid for providing electrical power to the busbar with a main voltage and an auxiliary power source for selectively providing electrical power to the busbar with an auxiliary power voltage, wherein the main voltage is different from the auxiliary power voltage. The system further comprises one or more wind turbines comprising a wind turbine generator, a main transformer for connecting the wind turbine generator to the busbar, one or more wind turbine components and an auxiliary wind turbine transformer for connecting the main transformer to the wind turbine components. The main transformer or the auxiliary transformer is configured to modify a ratio of turns of a primary winding to turns of a secondary winding of the transformer to maintain a constant voltage at the wind turbine components regardless of the voltage at the busbar.

In some examples, the primary winding of the main transformer is configured to receive electrical power from the busbar and the secondary winding of the main transformer is configured to deliver electrical power to the wind turbine generator and wherein the primary winding of the auxiliary transformer is configured to receive electrical power from the main transformer and the secondary winding of the auxiliary transformer is configured to deliver electrical power to the wind turbine components.

In yet further examples, the system comprises an auxiliary transformer switch arranged to modify the ratio of the auxiliary wind turbine transformer by alternatively connecting to the main wind turbine transformer either a first set of turns of the primary winding of the auxiliary wind turbine transformer or a second set of turns of the primary winding of the auxiliary wind turbine transformer, wherein the second set of turns may include the first set of turns.

In a further aspect of the present disclosure, a method for providing electrical power to one or more wind turbine components in a system is provided. The system comprises a busbar, an electrical grid for providing electrical power to the busbar with a main voltage and an auxiliary power source for selectively providing electrical power to the busbar with an auxiliary power voltage, wherein the main voltage is different from the auxiliary power voltage. The system further comprises one or more wind turbines comprising a wind turbine generator, a main transformer for connecting the wind turbine generator to the busbar, one or more wind turbine components, and an auxiliary wind turbine transformer for connecting the main transformer to the wind turbine components, the wind turbine components being arranged to be selectively connected to the main transformer and the busbar through a first path or a second path. The method comprises detecting a drop in the electrical power supplied from the electrical grid selecting the second path for connecting the busbar and the main transformer to the wind turbine components and operating the auxiliary power source to provide power to the busbar.

In some examples, the method further comprises switching off the auxiliary power source and selecting the first path for connecting the busbar and the main transformer to the wind turbine components.

In some other examples, the method further comprises delivering an electrical power of 0.4 kV to the wind turbine components by the auxiliary wind turbine transformer.

In examples, the auxiliary power source is a diesel generator.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A system for providing electrical power to one or more wind turbine components, comprising:
    a busbar,
    an electrical grid for providing electrical power to the busbar with a main voltage,
    an auxiliary power source for selectively providing electrical power to the busbar with an auxiliary power voltage, wherein the main voltage is different from the auxiliary power voltage,
    one or more wind turbines comprising: a wind turbine generator, a main transformer for connecting the wind turbine generator to the busbar, one or more wind turbine components; an auxiliary wind turbine transformer for connecting the main transformer to the wind turbine components, and
    the wind turbine components arranged to be selectively connected to the main transformer and the busbar through a first path if the voltage at the busbar is the main voltage and to be selectively connected to the main transformer and the busbar through a second path if the voltage at the busbar is the auxiliary power voltage.

2. A system according to claim 1, wherein the first path includes the auxiliary wind turbine transformer and the second path does not include the auxiliary wind turbine transformer.

3. A system according to claim 1, wherein the first and second path include the auxiliary wind turbine transformer, and wherein the main transformer comprises a primary winding and a secondary winding, wherein the primary winding is configured to receive electrical power from the busbar and the secondary winding is configured to deliver electrical power to the wind turbine generator, wherein the auxiliary wind turbine transformer comprises a primary winding and a secondary winding, wherein the primary winding is configured to receive electrical power from the main transformer and the secondary winding is configured to deliver electrical power to the wind turbine components, wherein the main transformer or the auxiliary transformer is configured to modify a ratio of turns of the primary winding to turns of the secondary winding of the transformer to maintain a constant voltage at the wind turbine components regardless of the voltage at the busbar.

4. A system according to claim 3, further comprising a primary switch arranged to modify the ratio of turns of the main transformer by connecting the busbar to a first set of turns of the primary winding of the main transformer or to a second set of turns of the primary winding of the main transformer.

5. A system according to claim 4, wherein the first set of turns includes the second set of turns.

6. A system according to claim 4, wherein the main transformer is a three-winding transformer and the three-winding transformer comprises two primary windings, wherein the first primary winding comprises the first set of turns and the second primary winding comprises the second set of turns.

7. A system according to claim 4, wherein the primary switch includes a circuit breaker.

8. A system according to claim 4, wherein the primary switch includes a first tap for connecting the busbar to the first set of turns of the primary winding, and a second tap for connecting the busbar to the second set of turns of the primary winding.

9. A system according to claim 3, further comprising a secondary switch arranged to modify the ratio of the main transformer by alternatively connecting either a first set of turns of the secondary winding of the main transformer or a second set of turns of the secondary winding of the main transformer.

10. A system according to claim 9, wherein the first set of turns includes the second set of turns.

11. A system according to claim 3, further comprising an auxiliary transformer switch arranged to modify the ratio of the auxiliary wind turbine transformer by alternatively connecting to the main wind turbine transformer either a first set of turns of the primary winding of the auxiliary wind turbine transformer or a second set of turns of the primary winding of the auxiliary wind turbine transformer.

12. A system according to claim 11, wherein the second set of turns includes the first set of turns.

13. A method for providing electrical power to one or more wind turbine components in a system according to claim 1, the method comprising:
    detecting a drop in the electrical power supplied from the electrical grid,
    selecting the second path for connecting the busbar and the main transformer to the wind turbine components, and
    operating the auxiliary power source to provide power to the busbar.

14. A method according to claim 13, further comprising when power is detected at the electrical grid,
    switching off the auxiliary power source, and
    selecting the first path for connecting the busbar and the main transformer to the wind turbine components.

15. A method according to claim 14, further comprising delivering an electrical power of 0.4 kV to the wind turbine components by the auxiliary wind turbine transformer.

* * * * *